United States Patent [19]

Morita

[11] Patent Number: 4,918,465
[45] Date of Patent: Apr. 17, 1990

[54] MULTI-COLOR BEAM SCANNER WITH SIMULTANEOUS SCANNING ALONG A PLURALITY OF SCAN LINES

[75] Inventor: Naoyuki Morita, Kaisei, Japan

[73] Assignee: Fuji Photo Film Co., Ltd., Kanagawa, Japan

[21] Appl. No.: 204,805

[22] Filed: Jun. 10, 1988

[30] Foreign Application Priority Data

Jun. 10, 1987 [JP] Japan .................................. 144971
Jun. 10, 1987 [JP] Japan .................................. 144972

[51] Int. Cl.$^4$ .......................... G01D 15/14; H04N 1/46
[52] U.S. Cl. ........................................ 346/108; 358/75
[58] Field of Search ................. 346/108, 160, 107 R; 358/296, 300, 302, 75

[56] References Cited

U.S. PATENT DOCUMENTS 2,571,322 10/1951 Yelland ................................ 358/75
4,672,258 6/1987 Konishi ............................. 346/108
4,801,950 1/1989 Frehling ............................ 346/108

Primary Examiner—Bruce A. Reynolds
Assistant Examiner—Mark Reinhart
Attorney, Agent, or Firm—Sughrue, Mion, Zinn, Macpeak & Seas

[57] ABSTRACT

A multi-color beam exposure system produces light of plural colors focused to form a multi-color focused image on the photosensitive material issued around a drum. The exposure system produces a plurality of light beams of each of the multi-colors and focuses each plurality of beams of the same color along the axial direction of the drum to thereby simultaneously scan the photosensitive material along a plurality of scanning lines. To reduce the size and weight of the drum scanner, the light sources producing the multi-color beams are placed remote from the drum and an optical fibers system transmits and focuses the multi-color beams onto the photosensitive material.

17 Claims, 3 Drawing Sheets

FIG. 7
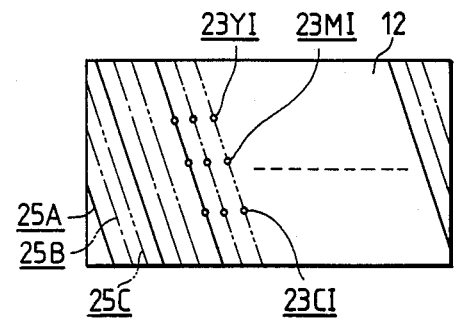
FIG. 8
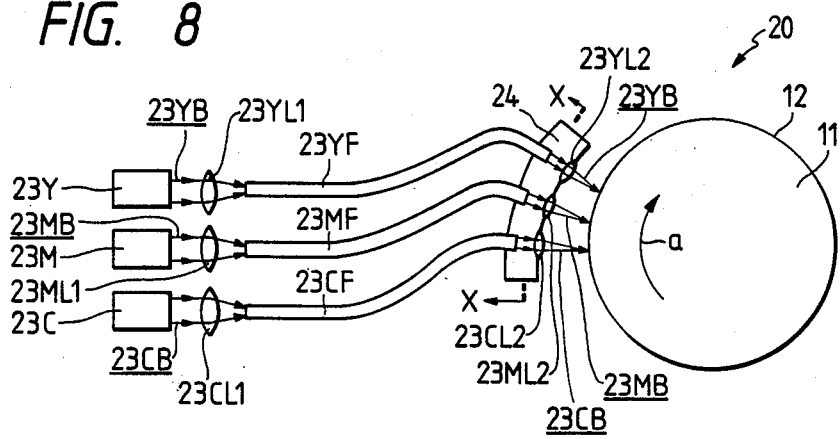
FIG. 9(A)   FIG. 9(B)   FIG. 9(C)
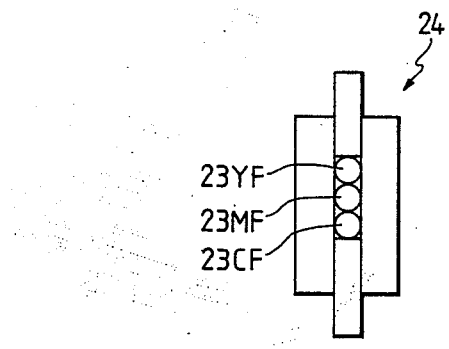 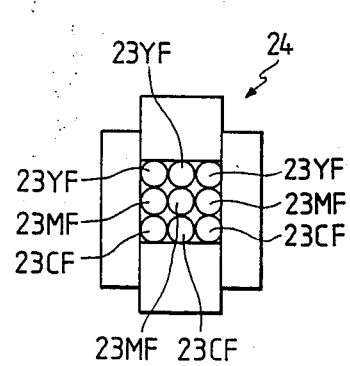 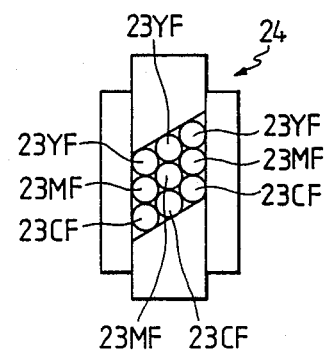

MULTI-COLOR BEAM SCANNER WITH SIMULTANEOUS SCANNING ALONG A PLURALITY OF SCAN LINES

BACKGROUND OF THE INVENTION

1. Field of the Invention

The present invention relates to a multi-color beam exposure system for exposing photosensitive material to light beams of multiple colors.

2. Background Art

FIG. 1 shows a drum scanner 10 used in conventional color printers and the like. There is provided in the drum scanner 10 three light emitting diodes (LED) 13C, 13M, and 13Y for respectively emitting three beams 13CB, 13MB, and 13YB of different colors (for example, an infrared-ray (IR) beam having a wavelength of 805 nm, a red (R) beam having a wavelength of 665 nm, and a yellow (Y) beam having a wavelength of 570 nm, respectively). There is also provided in the drum scanner three focusing optical systems 13CL, 13ML, and 13YL situated so that the respective beams 13CB, 13MB, and 13YB are focused to form focused images 13CI, 13MI, and 13YI on a color photosensitive material 12 wound around a drum 11. The focused images act to develop three color C (cyanogen), M (magenta), and Y (yellow) on the photosensitive material.

In a known exposure system for the drum scanner 10 a single line is exposed to the focused beams during each revolution of the drum 11 (in the direction of an arrow a in the drawing). The drum 11 is stopped after each revolution and the focused images 13CI, 13MI, and 13YI are displaced a predetermined distance in the axial direction b of the drum 11. The foregoing series of operations are repeated until the focused beams have scanned all the scan lines. This process is called intermittent sub-scanning feeding. FIG. 2 shows scanning lines 14 on the color photosensitive material 12 when exposure is carried out by the foregoing intermittent sub-scanning feeding. As seen from FIG. 2, the scanning lines 14 are obtained on the photosensitive material 12 in the form of parallel straight lines disposed at predetermined regular intervals.

An alternative known exposure system, uses an exposure process known as continuous sub-scanning feeding. In this exposure process the revolution of the drum 11 (in the direction of the arrow a) is synchronized with the displacement of the focused images 13CI, 13MI, and 13YI in the axial direction b of the drum 11. FIG. 3 shows scanning lines 15 on the color photosensitive material 12 when exposure is carried out by the continuous sub-scanning feeding method. In this case, the scanning lines 15 are obtained on the photosensitive material 12 in the form of parallel oblique lines disposed at predetermined regular intervals. Since the scanning lines 15 trace a spiral on the drum 11, it is necessary to dispose the focused images 13CI, 13MI and 13YI offset from each other so that the focused images 13CI, 13MI, and 13YI are aligned along each scanning line 15, as shown in FIG. 3.

Both systems suffer the drawback of requiring a long exposure time because in each exposure of only one scanning line can be performed during each revolution of the drum.

Although the foregoing drawback can somewhat ameliorated by increasing the drum speed, there is a practical limit on drum speed. Another limit on drum speed is the required exposure time necessary to effect development. As the light output from LED's is limited as is the sensitivity of the color photosensitive method there is a minimum exposure time necessary to properly expose the photosensitive material.

Further, since in the conVentional system the light emitting diodes 13C, 13M, and 13Y for emitting color beams and the focusing optical systems 13CL, ML, and 13YL are mounted on a sub-scanning exposure head 4 as shown in FIG. 4, there is the additional problem that the sub-scanning exposure head 4 is so heavy its maximum speed is severely limited because of its large inertia force. It is also low in positioning accuracy because of large friction drag, particularly in the case where high-speed intermittent driving is performed by a drum scanner 10. Still further, the sub-scanning exposure head 4 is very bulky thus restricting reduction of drum scanner 10 size.

SUMMARY OF THE INVENTION

It is therefore an object of the present invention to solve the foregoing problems in the prior art.

It is another object of the present invention to provide a multi-color beam exposure system in which exposure to a color photosensitive material can be surely performed at a high speed.

In order to attain the above objects, according to an aspect of the present invention, a multi-color beam exposure system for focusing multiple beams of different colors on a photosensitive material wound around a drum produces plural beams of each color such that the plural beams of a like color are aligned in the axial direction of the drum so as to simultaneously expose the photosensitive material with plural focused images at each color.

In order to attain the above objects, according to another aspect of the present invention; a multi-color beam exposure system for focusing multiple beams of different colors on a photosensitive material wound around a drum is constructed such that the light emitting sources producing the multiple colors are provided remote from the drum and optical fibers are provided to transmit and focus the light emitted from the light emitting sources onto the photosensitive material to thereby expose the photosensitive material.

BRIEF DESCRIPTION OF THE DRAWINGS

The above and other objects of the present invention will be apparent from the following detailed description taken in conjunction with the accompanying drawings, in which:

FIGS. 6 and 7 are plan views showing examples of the scanning lines on a color photosensitive material obtained using an exposure system according to the first embodiment of the present invention;

FIG. 8 is a side view schematically showing the drum scanner in a second embodiment of the multi-color beam exposure system according to the present invention: and FIGS. 9(A) to 9(C) are sectional views showing various examples of the arrangement of the sub-scanning exposure head.

DETAILED DESCRIPTION OF THE PREFERRED EMBODIMENTS

Figure 1:
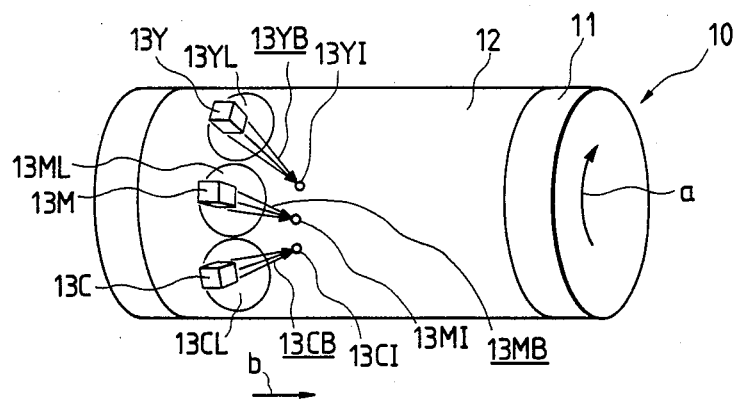
FIG. 1 is a perspective view schematically showing a conventional drum scanner.
Figure 2:
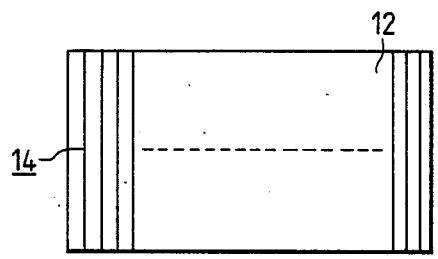
FIGS. 2 and 3 are plan views showing examples of the scanning lines on a color photosensitive material produced by the conventional systems.
Figure 3:
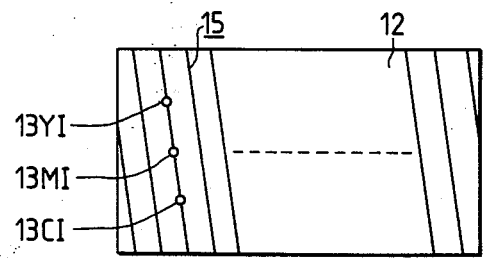
Figure 4:
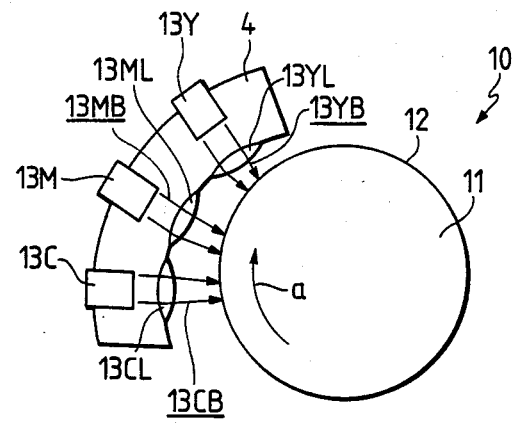
FIG. 4 is a side view schematically showing a conventional drum scanner.
Figure 5:
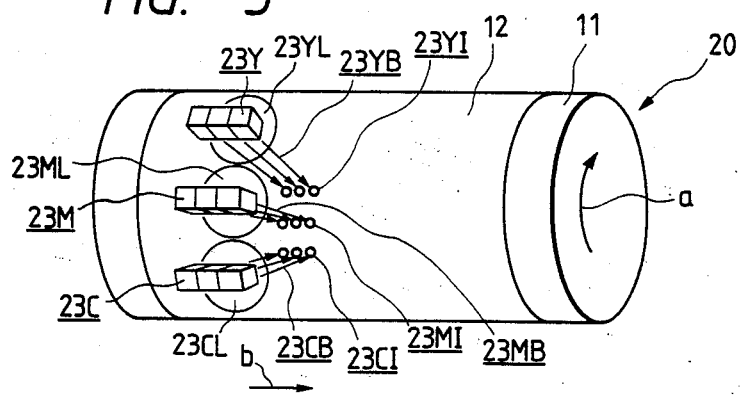
FIG. 5 is a perspective view schematically showing the drum scanner according a first embodiment of the multi-color beam exposure system of the present invention.

FIG. 5 shows a drum scanner 20 in a first embodiment of the multi-color beam exposure system according to the present invention. As shown in the drawing, three light emitting diodes 23C for emitting three beams 23CB each having a wavelength for developing a color C (cyanogen) on a photosensitive material, three light emitting diodes 23M for emitting three beams 23MB each having a wavelength for developing a color M (magenta) on the photosensitive material, three light emitting diodes 23Y for emitting three beams 23YB each having a wavelength for developing a color Y (yellow) on the photosensitive material, and three focusing optical systems 23CL, 23ML, and 23 YL for focusing the three beams 23CB, the three beams 23MB, and the three beams 23YB, respectively, onto a surface of a color photosensitive material 12 wound around a drum 11 are provided in a manner so that three focused images 23CI of the three beams 23CB, three focused images 23MI of the three beams 23MB, and three focused images 23YI of the three beams 23YB are respectively aligned in the axial direction of the drum 11.

Figure 6:

The multi-color beam exposure system of the invention can be used with both the intermittent sub-scanning feeding process and the continuous sub-scanning/feeding process. With the intermittent sub-scanning feeding process exposure of three scanning lines is simultaneously carried out in one revolution of the drum 11. The drum 11 is stopped after each revolution so that all the focused images 23CI, 23MI, and 23YI can displace a predetermined distance in the axial direction b of the drum 11. A succeeding exposure of three scanning lines is carried out during the succeeding revolution of the drum 11. The foregoing series of operations are repeated until the photosensitive material is fully scanned. FIG. 6 shows scanning lines 24A, 24B and 24C on the color photosensitive material 12 when exposure is carried out by the foregoing intermittent sub-scanning feeding process. In this case, the scanning lines 24A, 24B and 24C can be obtained on the photosensitive material 12 in the form of parallel straight lines disposed at predetermined regular intervals.

Using the continuous sub-scanning feeding process exposure is carried out under the condition that the revolution of drum 11 (in the direction of the arrow a) is synchronized with the displacement of the focused images 23CI, 23MI, and 23YI in the axial direction b of the drum 11. FIG. 7 shows scanning lines 25A, 25B, and 25C produced on the color photosensitive material 12 when exposure is carried out by the foregoing continuous sub-scanning feeding process. In this case, the scanning lines 25A, 25B and 25C are obtained on the photosensitive material 12 in the form of parallel oblique lines disposed at predetermined regular intervals. Since each of the scanning lines 25A, 25B, and 25C traces a spiral on the drum 11 when exposure is carried out by the continuous sub-scanning feeding, it is necessary to arrange the three sets of the focused images 23CI, 23MI, and 23YI slantingly so that each set of three focused images 23CI, 23MI, and 23YI is arranged along each of the scanning lines 25A, 25B and 25C, as shown in FIG. 7.

In the thus arranged systems, exposure of three scanning lines can be performed simultaneously during one revolution of the drum. This permits tripling the exposure speed as compared to the conventional system. Although three focused images are formed with respect to each color in the foregoing embodiment, the present invention is not limited to this specific example, and arrangements may be made using a plurality of focused images for each color to be developed. Further, it is effective to arrange the system such that each of the focused images, that is, the quantity of light emitted from each of the light emitting diodes can be controlled. Still further, laser diodes (LD) or the like may be used in place of the light emitting diodes.

The foregoing systems can be applied not only to any kind of color photosensitive materials but to monochrome photosensitive materials.

In the first embodiment of the multi-color beam exposure system according to the present invention, as described above, exposure of a plurality of scanning lines are performed during each drum revolution thereby realizing high speed exposure without having to increase light source intensity or sensitivity of the photosensitive material. It is therefore possible to reduce cost.

FIG. 8 shows a drum scanner 20 according to a second embodiment of the multi-color beam exposure system of the present invention. In the drawing, three light emitting diodes 23C, 23M, and 23Y for emitting three light beams each of a different color, 23CB, 23MB, and 23YB and having wavelengths so as to develop three colors C (cyanogen), M (magenta), and Y (yellow) on a photosensitive material wound around a durm 11, and three converging optical systems 23CL1, 23ML1, and 23YL1 for converging the respective beams 23CB, 23MB, and 23YB are provided remote from the drum 11. Optical fibers 23CF, 23MF, and 23YF are disposed such that an end of each of the fibers receives a respective converged beam 23CB, 23MB, or 23YB so that the beams 23CB, 23MB, and 23YB emitted from the respective light emitting diodes 23C, 23M, and 23Y are transmitted to a sub-scanning exposure head 24 disposed in the vicinity of the circumferential surface of the drum 11. The other ends of the respective optical fibers 23CF, 23MF, and 23YF and focusing optical systems 23CL2, 23ML2, and 23YL2 for focusing the transmitted color beams 23CB, 23MB, and 23YB onto the surface of the color photosensitive material 12 are mounted on the sub-scanning exposure head 24.

Using beam exposure system depicted in FIG. 8 to carry out exposure, high-speed intermittent driving can be performed as the sub-scanning exposure head 24 is lightweight. The weight of the sub-scanning exposure head 24 may in fact be a quarter or less of the conventional head. If each of the optical fibers 23CF, 23MF, and 23YF can focus the beams, the focusing optical systems 23CL2, 23ML2, and 23YL2 can be eliminated so that the weight of the sub-scanning exposure head 24 can be further reduced to thereby make it possible to perform intermittent driving at an even higher speed.

FIGS. 9(A) to 9(C) are sections taken on line X—X of FIG. 8 and showing examples of the arrangement of the optical fibers 23CF, 23MF, and 23YF mounted on the sub-scanning exposure head 24. Ordinarily, the optical fibers 23CF, 23MF, and 23YF for transmitting the color beams are disposed longitudinally, that is, in the rotating direction of the drum 11, as shown in FIG. 9A. In the case where exposure of a plurality of scanning lines, for example, three scanning lines, is performed during each revolution of the drum 11, three sets of optical fibers 23CF, 23MF, and 23YF for transmitting the color beams are provided, each set including three optical fibers 23CF, 23MF, and 23YF, such that each set of three optical fibers 23CF, 23MF, and 23YF are disposed longitudinally, that is, in the rotating direction of the drum 11, as shown in FIG. 9(B) or 9(C). Using the thus arranged sub-scanning exposure head 24, it is possible to increase the scanning speed (three times as fast as the ordinary speed in the illustrated embodiment). Although the illustrated embodiment shows exposure of three scanning lines by the sub-scanning exposure head 24 of the second embodiment, the present invention is not limited to such a specific embodiment, but is applicable to exposure of a plurality of scanning lines using of a plurality of color beams or a multi-color beam. If a multi-color beam is used, the three focusing optical systems 23CL2, 23ML2, and 23YL2 may be realized as a single common optical system.

Further, although the foregoing description was with respect to the exposure system of the invention applied to the intermittent sub-scanning feeding process, the present invention is not limited to such a specific embodiment. It is also applicable to the continuous sub-scanning feeding process. Still, further, the light sources are not limited to light emitting diodes, but may be laser diodes.

In the second embodiment of the color beam exposure system according to the present invention, the sub-scanning exposure head can be reduced in weight so that exposure can be carried out at high speed with high accuracy. Further, the apparatus can be reduced in size because the light sources are disposed separately from the drum.

What is claimed is:

1. In a multi-color beam exposure system in which light of plural colors is emitted and focused to form a multi-color focused image on a photosensitive material would around a drum, the improvement comprising:
means for providing a plurality of said multi-color beams focused on said photosensitive material and in the axial direction of said drum to form a plurality of said multi-color beams along each one of a plurality of scan lines in the axial direction of the drum thereby to expose said photosensitive material along a plurality of scan lines simultaneously.

2. In a system for developing colors on a color photosensitive material by exposing the photosensitive material along a scanning line to a plurality of light beams each of a different color, a light beam exposure apparatus comprising:
means for producing a plurality of light beams of each of said different colors, and
means for simultaneously scanning each light beam of the same color along a plurality of different scanning lines of said photosensitive material, thereby to decrease the exposure time completely to expose said photosensitive material.

3. The system for developing colors on a color photosensitive material according to claim 2 wherein said photosensitive material is wound around a drum and further including means for focusing said plurality of light beams of each of said different colors along the axial direction of said drum, the light beams of different colors being focused on the photosensitive material in the direction of drum rotation.

4. The color beam exposure system as claimed in claim 1, wherein said means for providing a plurality of said multi-color beams comprises light generating means for generating said multi-color beams remote from said drum, and optical fiber means for transmitting and focusing said multi-color beams onto said photosensitive material thereby to expose said photosensitive material to said multi-color beams.

5. The color beam exposure system as claimed in claim 4, wherein at least three scan lines are simultaneously scanned with each rotation of said drum, and wherein said plurality of said multi-color beams are formed along each one of said at least three scan lines.

6. The color beam exposure system as claimed in claim 5, wherein said means for providing a plurality of said multi-color beams comprises orthogonal array means to form said plurality of said multi-color beams along a plurality of scan lines, and wherein said system uses an intermittent sub-scanning feeding process to feed said photosensitive material with respect to a rotation of said drum.

7. The color beam exposure system as claimed in claim 5, wherein said means for providing a plurality of said multi-color beams comprises oblique array means to form said plurality of said multi-color beams along a plurality of scan lines, and wherein said system uses a continuous sub-scanning feeding process to feed said photosensitive material with respect to a rotation of said drum.

8. The color beam exposure system as claimed in claim 7, wherein a quantity or level of light of each beam of said plurality of said multi-color beams can be controlled.

9. The color beam exposure system as claimed in claim 8, wherein said means for providing a plurality of said multi-color beams comprises light emitting diode means.

10. The color beam exposure system as claimed in claim 8, wherein said means for providing a plurality of said multi-color beams comprises laser diodes.

11. The system for developing colors on a color photosensitive material according to claim 3 wherein said means for producing a plurality of light beams comprises light generating means for generating said plurality of light beams remote from said drum, and wherein said means for focusing comprises optical fiber means for transmitting and focusing said light beams onto said photosensitive material thereby to expose said photosensitive material to said light beams.

12. The system for developing colors on a color photosensitive material according to claim 11, wherein at least three scan lines are simultaneously scanned with each rotation of said drum, and wherein said plurality of said light beams are formed along each one of said at least three scan lines.

13. The system for developing colors on a color photosensitive material according to claim 12, wherein said means for producing a plurality of light beams comprises orthogonal array means to form said plurality of said light beams along a plurality of scan lines, and wherein said system uses an intermittent subscanning feeding process to feed said photosensitive material with respect to a rotation of said drum.

14. The system for developing colors on a color photosensitive material according to claim 12, wherein said means for producing a plurality of light beams comprises oblique array means to form said plurality of said light beams along a plurality of scan lines, and wherein said system uses an continuous subscanning feeding process to feed said photosensitive material with respect to a rotation of said drum.

15. The system for developing colors on a color photosensitive material according to claim 14, wherein a quantity or level of light of each beam of said plurality of said light beams can be controlled.

16. The color beam exposure system as claimed in claim 15, wherein said means for providing a plurality of said light beams comprises light emitting diode means.

17. The system for developing colors on a color photosensitive material according to claim 15, wherein said means for providing a plurality of said light beams comprises laser diodes.

* * * * *